(12) United States Patent
Zeilenga et al.

(10) Patent No.: US 8,732,917 B2
(45) Date of Patent: May 27, 2014

(54) STANDING SEAM ROOF CLAMP

(75) Inventors: Chad K. Zeilenga, Crete, IL (US); Charles Olen Nehls, Allen Park, MI (US)

(73) Assignee: Atkore International, Inc., Harvey, IL (US)

( * ) Notice: Subject to any disclaimer, the term of this patent is extended or adjusted under 35 U.S.C. 154(b) by 414 days.

(21) Appl. No.: 13/034,824

(22) Filed: Feb. 25, 2011

(65) Prior Publication Data

US 2012/0047827 A1 Mar. 1, 2012

Related U.S. Application Data

(60) Provisional application No. 61/308,535, filed on Feb. 26, 2010.

(51) Int. Cl.
*F16B 2/06* (2006.01)
*E04D 13/18* (2006.01)

(52) U.S. Cl.
USPC .................. 24/569; 24/514; 52/24; 52/173.3

(58) Field of Classification Search
USPC .............. 52/24, 25, 173.3; 24/524, 542, 483, 24/486, 494, 495, 514, 569
See application file for complete search history.

(56) References Cited

U.S. PATENT DOCUMENTS

| | | | | |
|---|---|---|---|---|
| 5,222,340 A * | 6/1993 | Bellem | | 52/463 |
| 6,499,259 B1 * | 12/2002 | Hockman | | 52/26 |
| 6,602,016 B2 * | 8/2003 | Eckart et al. | | 403/110 |
| 6,681,971 B2 * | 1/2004 | Laverack et al. | | 224/319 |
| 7,013,612 B2 * | 3/2006 | Haddock | | 52/545 |
| 7,100,338 B2 * | 9/2006 | Haddock | | 52/545 |
| 7,127,852 B1 * | 10/2006 | Dressler | | 52/24 |
| 7,240,770 B2 * | 7/2007 | Mullins et al. | | 182/3 |
| 7,281,359 B2 * | 10/2007 | Marshall | | 52/712 |
| 7,386,922 B1 * | 6/2008 | Taylor et al. | | 24/569 |
| 8,070,119 B2 * | 12/2011 | Taylor | | 248/237 |
| 2002/0088196 A1 * | 7/2002 | Haddock | | 52/543 |
| 2002/0174524 A1 * | 11/2002 | Maunder | | 24/483 |
| 2003/0070368 A1 | 4/2003 | Shingleton | | |
| 2005/0102958 A1 * | 5/2005 | Anderson | | 52/698 |

(Continued)

FOREIGN PATENT DOCUMENTS

JP 2000220268 8/2000

OTHER PUBLICATIONS

International Preliminary Report on Patentability, PCT/US2011/026180, dated Aug. 28, 2012.

*Primary Examiner* — Robert J Sandy
*Assistant Examiner* — Louis Mercado
(74) *Attorney, Agent, or Firm* — Kacvinsky Daisak Bluni PLLC

(57) ABSTRACT

A clamp for attaching solar panel grids to standing seam roof structures. The clamp includes opposing clamp halves having inter-engageable projections and recesses. One or more fasteners engage the halves to draw them together. A first set of recesses on one clamp half receives a first set of projections on the other half. A second set of recesses on the other clamp half receives a second set of projections. When loose, the first set of projections engage the first set of recesses like a detent, while the second set of projections are spaced apart from the second set of recesses to enable the clamp to be slid down onto the vertical seam of a standing seam roof. Tightening the fasteners causes the second set of projections to deform the seam into the second set of recesses, fixing the clamp to the seam.

14 Claims, 14 Drawing Sheets

(56) References Cited

U.S. PATENT DOCUMENTS

| | | | |
|---|---|---|---|
| 2005/0217203 A1* | 10/2005 | Haddock | 52/782.1 |
| 2005/0257434 A1* | 11/2005 | Hockman | 52/24 |
| 2008/0250614 A1 | 10/2008 | Zante | |
| 2011/0162173 A1* | 7/2011 | Ciminski et al. | 24/303 |

* cited by examiner

“STANDING SEAM ROOF CLAMP

CROSS-REFERENCE TO RELATED APPLICATIONS

This is a non-provisional of U.S. provisional patent application Ser. No. 61/308,535, filed Feb. 26, 2010, by Chad Zeilenga, titled "Standing Seam Roof Clamp," the entirety of which application is incorporated herein by reference.

BACKGROUND OF THE INVENTION

1. Field of the Invention

Embodiments of the invention generally relate to the field of mounting clamps, and more particularly to the field of mounting clamps for use in securing solar panels to standing seam style roof applications.

2. Discussion of Related Art

Roof mounted solar panels are typically used to convert solar energy to electrical power. In some cases, these solar panels are used to generate hot water. These devices have been utilized in these applications for many years. A typical solar panel installation is comprised of a roof mounted grid system employing one of many various types of structural products including strut, angle iron and wood. The grid may be anchored to structural elements of the building or it may be mounted to the roof surface. Many buildings employ a standing seam type of roof construction in which metal sheathing material overlies the roofing structure, and individual roof panels are connected by a plurality of vertically oriented metal "seams."

With the recent emphasis placed upon alternative energy sources, there is a need for a convenient clamp for use in connecting solar panel grids to such standing seam roof structures. The clamp should enable quick and easy attachment of solar grids to standing seam roofs. The clamp should also be capable of integration into various grid designs and product alternatives.

SUMMARY OF THE INVENTION

A solar panel clamp is disclosed, comprising first and second opposing clamp portions. The first clamp portion comprises a first end and a second end, the first end including a first set of projections and the second end including a second set of projections. The second clamp portion comprises a first end and a second end, the first end including a first set of recesses and the second end including a second set of recesses. A fastener has a first end engageable with the first clamp portion and a second end engageable with the second clamp portion. Thus arranged, the fastener has a loosened configuration in which the first set of projections are retained within the first set of recesses and the second set of projections are spaced apart from the second set of recesses. The fastener further has a tightened configuration in which the first and second sets of projections are receivable within the first and second sets of recesses, respectively.

A solar panel clamp is disclosed, comprising first and second opposing clamp portions. The first clamp portion may have a first end and a second end. The first end may include a first projection and the second end may include a first recess. The second clamp portion may have a first end and a second end. The first end may include a second recess and the second end may include a second projection. A fastener may be engageable with the first and second clamp portions. The fastener may have a loosened configuration in which the first projection is received within the second recesses and the second projection is spaced apart from the first recess. The fastener further may have a tightened configuration in which the first projection is received within the second recess and the second projection is receivable within the first recess.

A clamp is disclosed, comprising first and second opposing clamp portions. The first and second clamp portions may be engageable with each other at first and second ends. A fastener may be engaged with the first and second clamp portions. The fastener may be movable from a loosened configuration, in which the first and second clamp portions are separated by a distance at the first end and are connected a the second end, to a tightened configuration in which the first and second clamp portions are connected at the first end. The first and second clamp portions may having corresponding projections and recesses disposed at respective second ends for deforming a captured portion of a roof seam as the fastener is moved from the loosened configuration to the tightened configuration.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

A clamp design is disclosed for use in securing solar panels to standing seam roof top structures. Due to its strength-efficient design, the disclosed clamp may be manufactured from relatively light gage aluminum or steel, and may be formed in a manner as to provide high strength in both tension and compression to offset in-situ forces such as wind lift and snow loads. The disclosed clamp design includes features that enable the clamp to be quickly and securely attached at one end to a roof standing seam, and to interface with a strut or other solar panel grid material at the other end. In addition, the disclosed clamp may be sized to provide a desired "stand-off" dimension that positions the solar panels—which are attached to the grid—a predetermined distance above the roof surface, facilitating appropriate drainage and air-flow around the panels.

Figure 1:
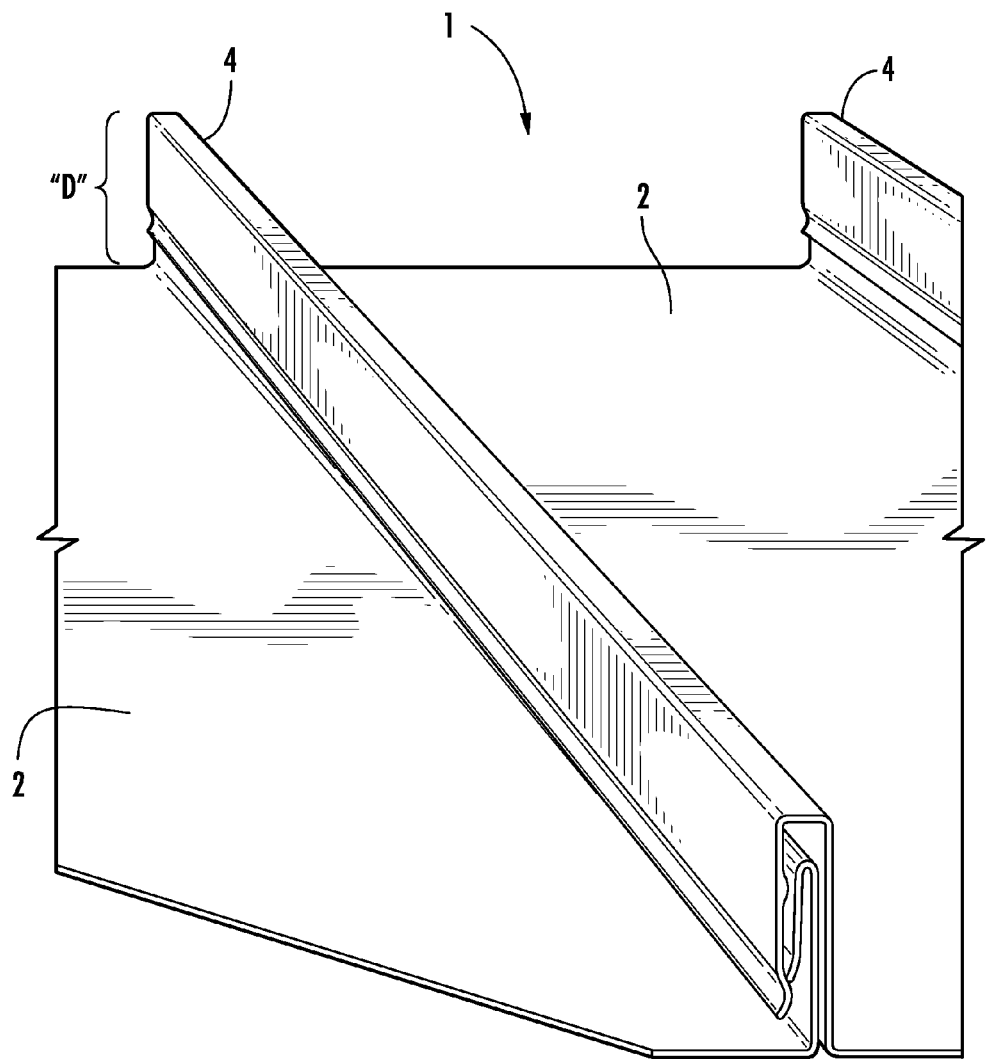
FIG. 1 is an isometric view of a typical metal standing seam roof design.

Referring to FIG. 1, a portion of a typical standing seam type roof 1 is shown. The roof 1 consists of a series of flat metal sheeting elements 2 connected via a plurality of vertically oriented standing seams 4 which extend a distance "D" above the plane of the sheeting elements 2. When structures such as solar panel grids are mounted to a standing seam roof 1, it is desirable to clamp the grids to the standing seams in order to avoid the need to pierce the sheeting elements 2 with fasteners such as screws or nails.

Figure 2:
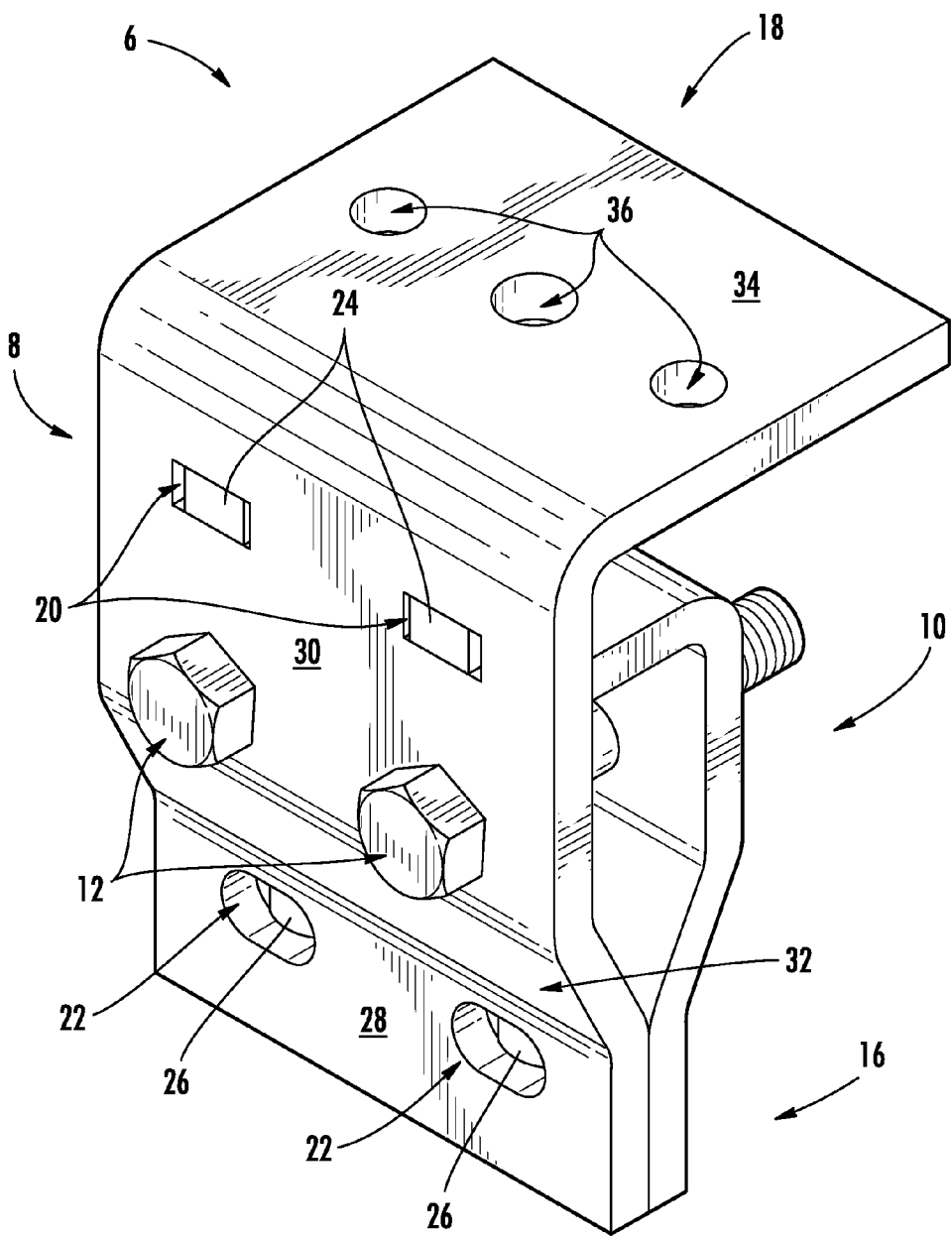
FIG. 2 is a an isometric view of the disclosed clamp.
Figure 3:
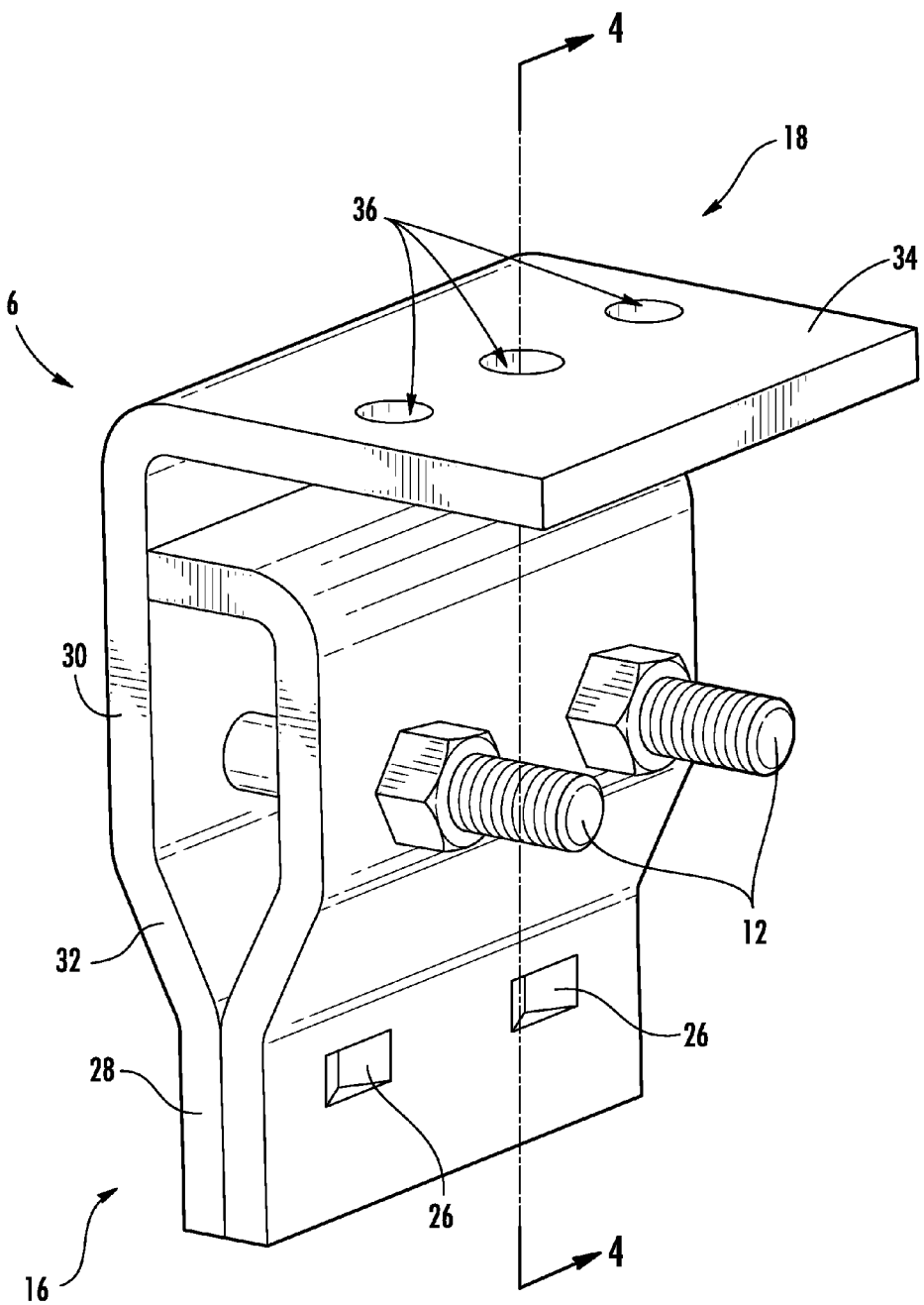
FIG. 3 is a reverse isometric view of the clamp of FIG. 2.

Referring to FIGS. 2 and 3, the clamp 6 may include first and second opposing clamp halves 8, 10 that are engageable with each other via fasteners 12 received within associated recesses 14 (FIG. 4) in each of the clamp halves 8, 10. The clamp 6 has a first end 16 configured to engage opposite flat sides of a standing seam 4 of a roof and to clamp to the seam upon tightening of the fasteners 12. The clamp 6 has a second end 18 that is configured to engage a grid structure (e.g., a channel member), to which a series of solar panels are mounted. Thus, arranged, the clamp 6 can be used to securely fix a solar panel grid (along with associated solar panels) to the standing roof 1 without piercing the sheeting elements 2 of the roof.

As can be seen in FIGS. 2-5, the first and second clamp halves 8, 10 include features that provide a keyed engagement between the halves. This keyed engagement provides for easy handling during installation, and also provides desired high strength and rigidity. The first clamp half 8 has first and second sets of recesses 20, 22 configured to receive first and second sets of projections 24, 26 of the second clamp half 10. As will be explained in greater detail later, the first set of projections 24 are loosely received within the first set of recesses 20 when the fasteners 12 are in the loosened condition (i.e., loose enough that the first end 16 of the clamp 6 can easily fit over an associated standing seam 4). Once the clamp 6 has been provisionally fit over the standing seam 4, the fasteners can be tightened so that the first set of projections is pressed toward the first set of recesses. This tightening causes the second set of projections 26 to deform the standing seam material into the second set of recesses 22, thus fixing the clamp 6 firmly to the seam.

It will be appreciated that although the second set of recesses 22 are sized to receive the second set of projections 26 when the clamp halves 8, 10 are tightened together, in normal operation the projections serve to deform the seam material into the recesses 22. As such, the projections 26 may not, themselves, be received by the recesses. Of course, where the seam material is particularly thin or malleable, the projections 26 may be received within the recesses 22 when the fasteners are tightened.

Figure 4:
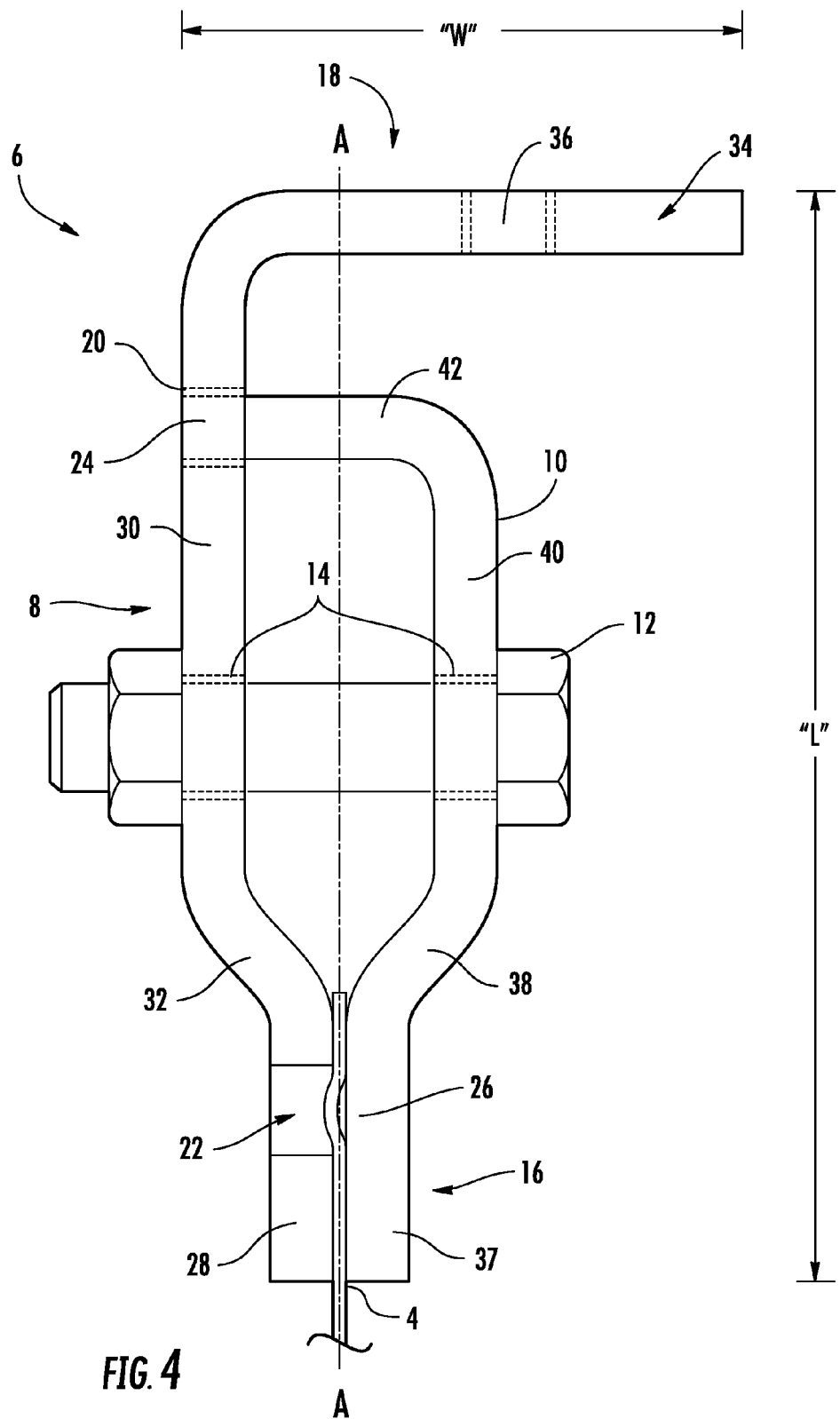
FIG. 4 is a cross-section view of a the clamp of FIGS. 2 and 3 taken along line 4-4 of FIG. 3.
Figure 5:
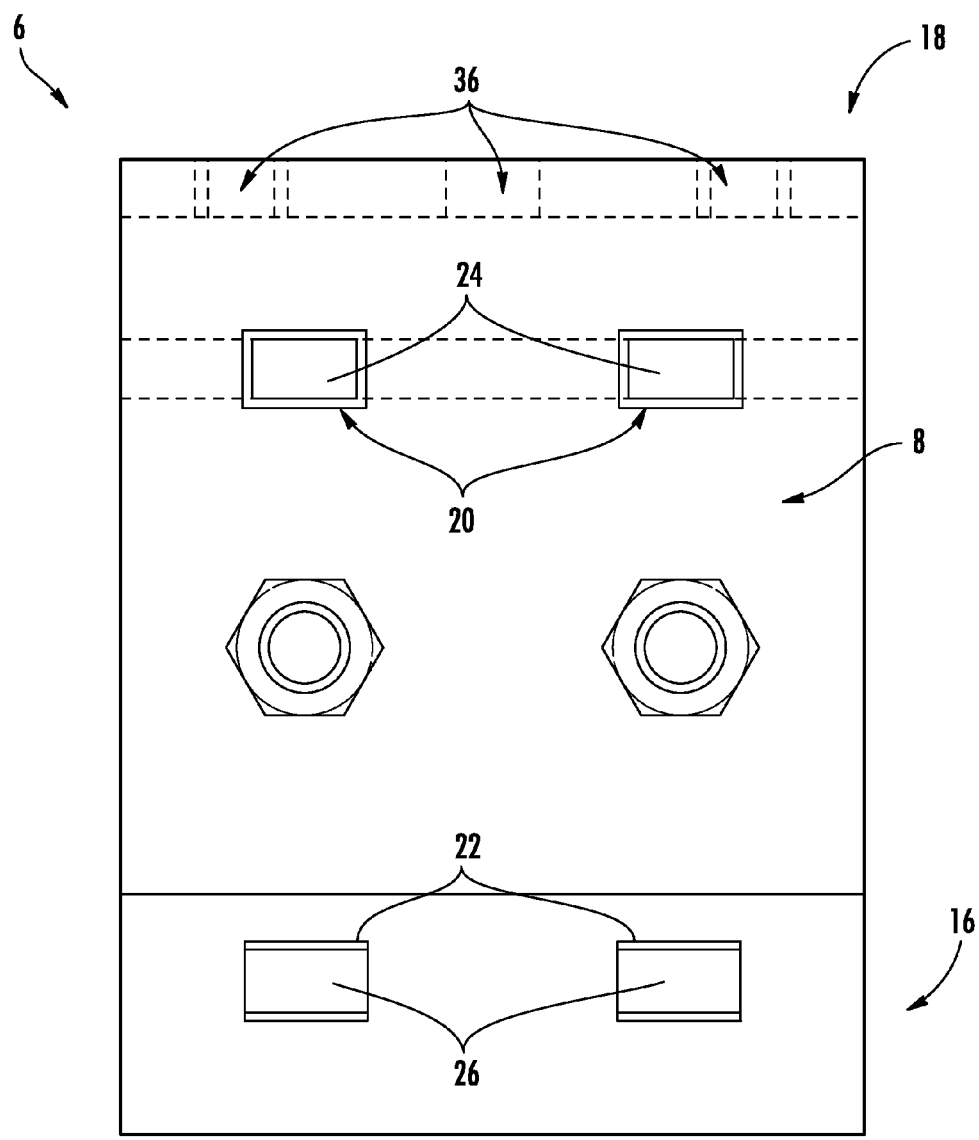
FIG. 5 is a side view of the clamp of FIG. 2.

Referring to FIG. 4, the first clamp half 8 may comprise first and second segments 28, 30 that are generally parallel to a longitudinal axis "A-A" of the clamp 6. The first and second segments are connected via a third segment 32 that is angled with respect to the longitudinal axis so as to position the second segment 30 away from the second clamp half 10 when the halves are connected. As can be seen, the second set of recesses 22 is disposed in the first segment 28. Further, the fastener recesses 14 are disposed in the second segment 30, as are the first set of recesses 20. The first clamp half 8 also has a fourth segment 34 which is connected to the second segment 30 and is oriented generally perpendicular to the longitudinal axis "A-A" of the clamp 6. This fourth segment 34 includes a plurality of holes 36 to enable the clamp 6 to engage a solar panel grid structure (e.g., a channel member), using one or more fasteners.

Figure 6:
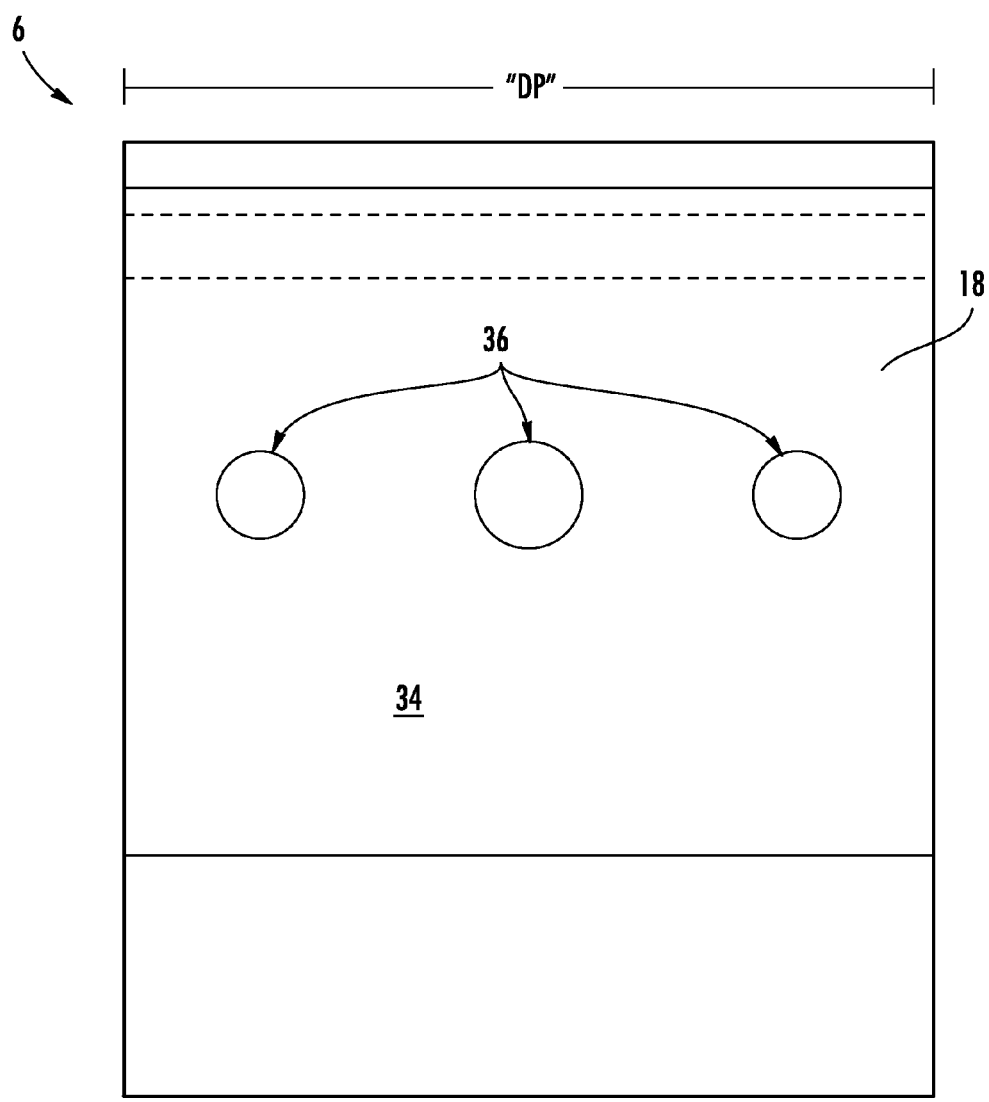
FIG. 6 is a top plan view of the clamp of FIG. 2.
Figure 7:
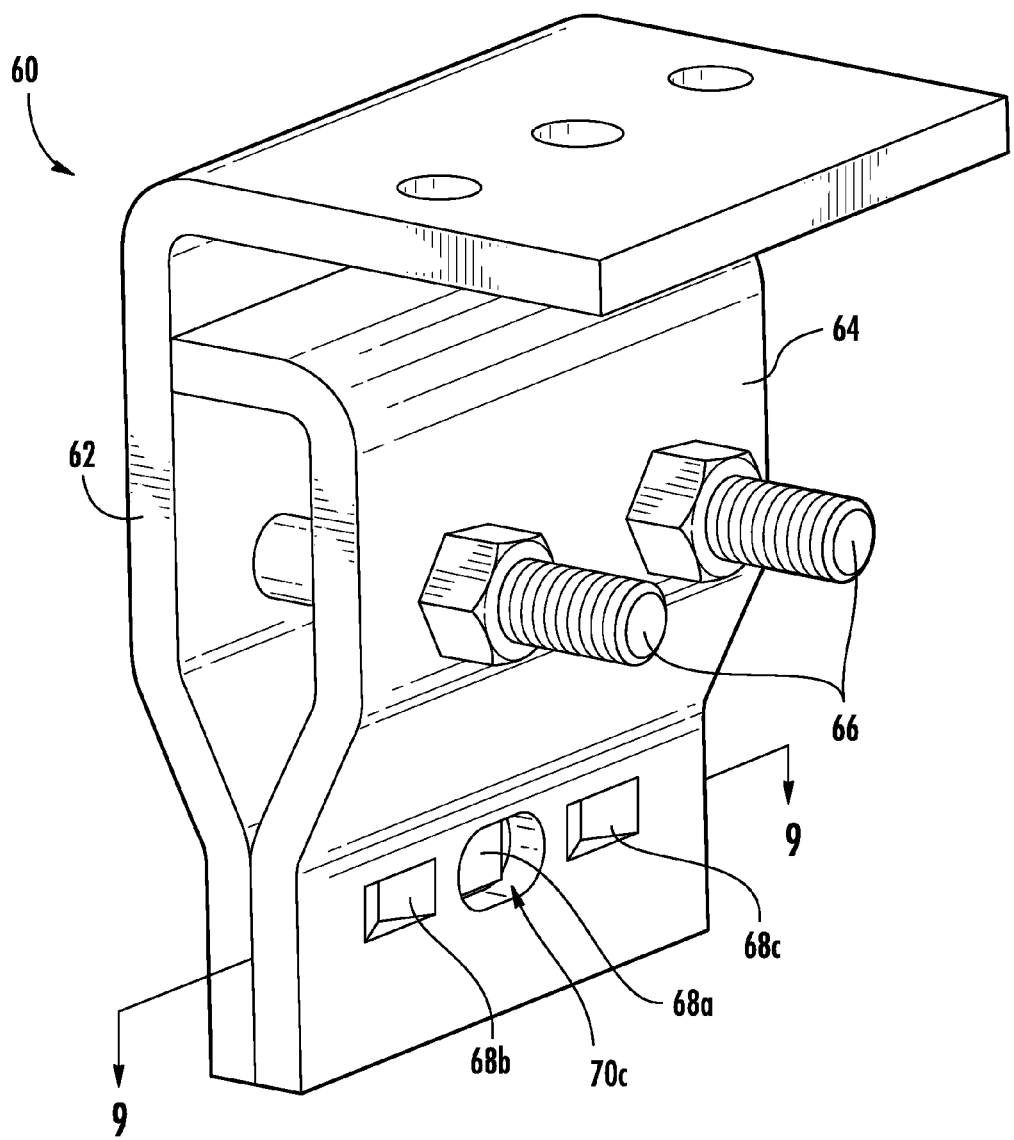
FIG. 7 is an isometric view of a further embodiment of a clamp for engaging a standing seam roof.
Figure 8:
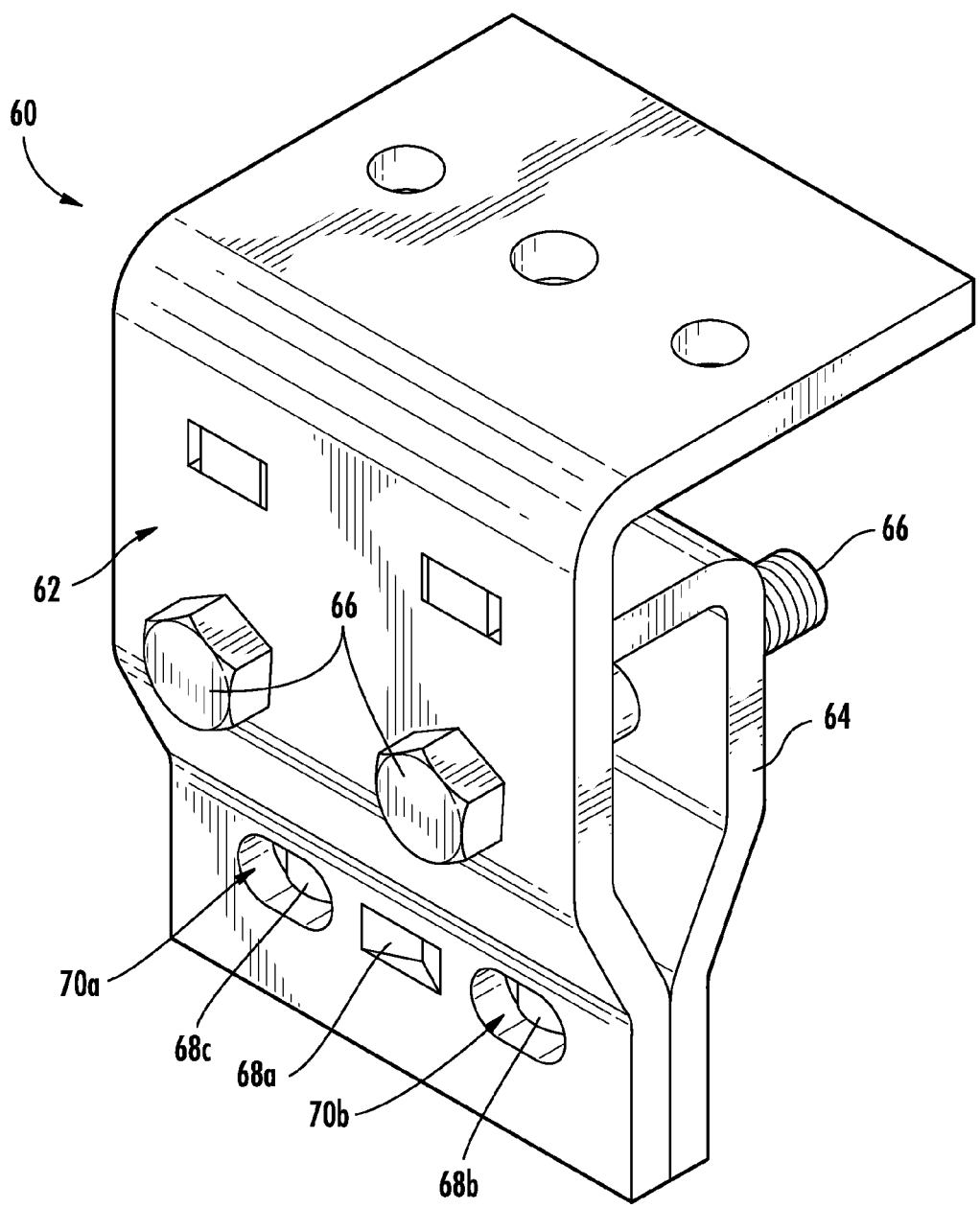
FIG. 8 is a reverse isometric view of the clamp of FIG. 7.
Figure 9:
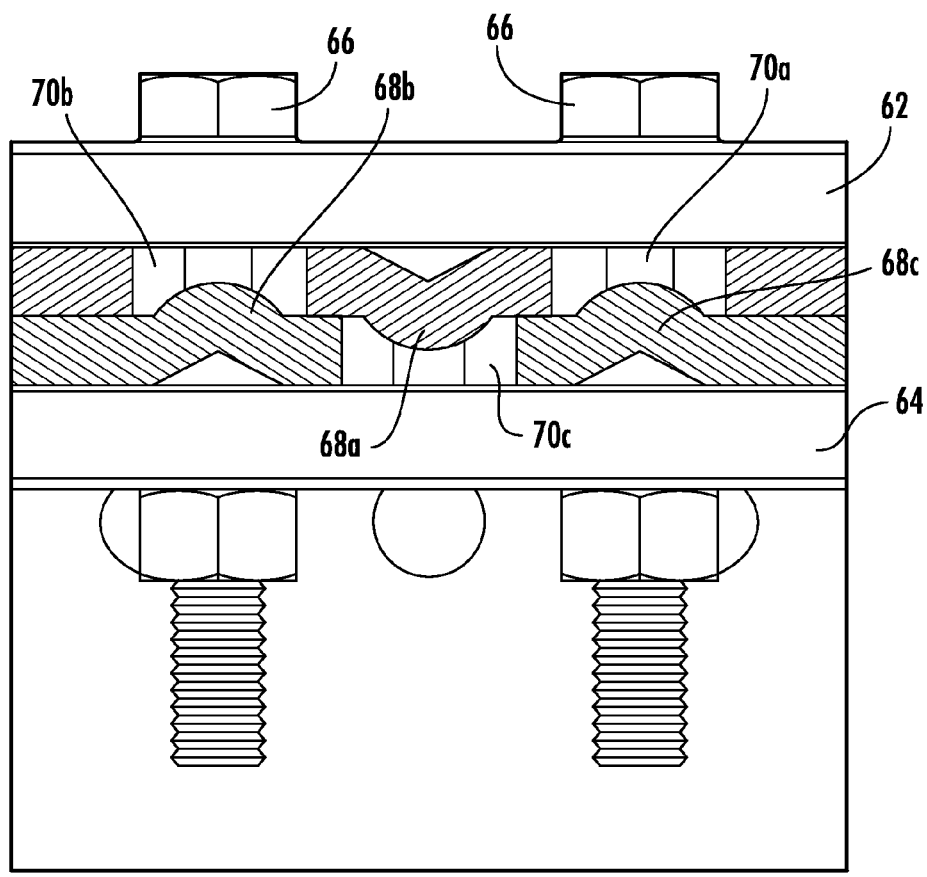
FIG. 9 is a cross-section view of the clamp of FIG. 7 taken alone line 9-9.
Figure 10:
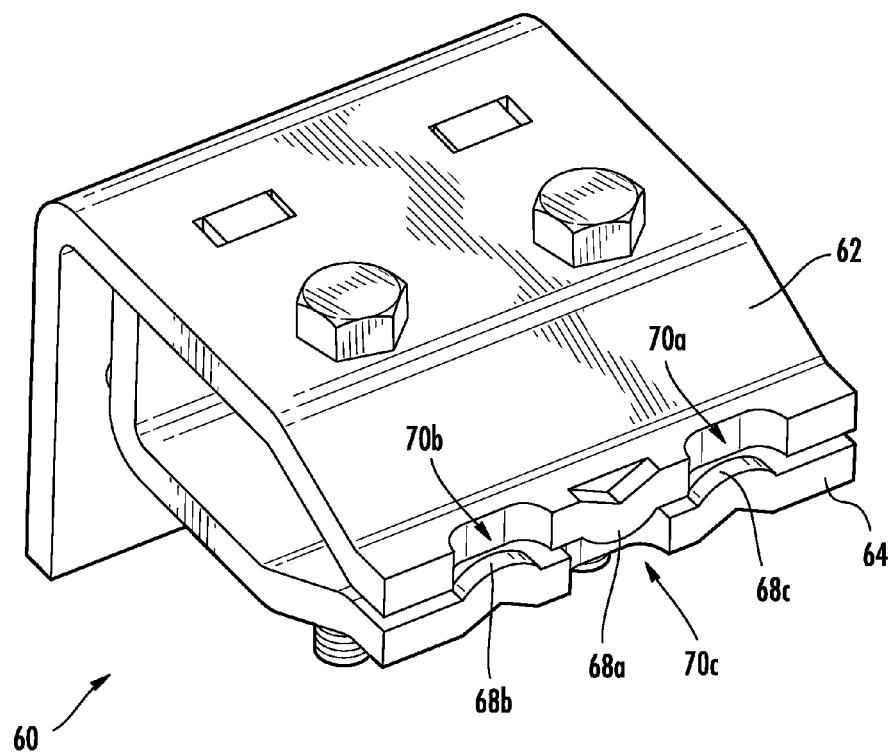
FIG. 10 is a partial cutaway view of the clamp of FIG. 7.

As shown in FIG. 6, the holes 36 in the fourth segment 34 of the first clamp half 8 may be of the same size, or they may be of different sizes, for accepting fasteners, such as bolts or screws, to allow the clamp 6 to be fastened to a variety of solar panel grid arrangements. The holes 36 may be tapped for receiving machine screws, or they may be flat for receiving bolts, rivets, or the like. In some embodiments, the holes 36 may be square to enable them to receive carriage bolts.

Referring again to FIG. 4, the second clamp half 10 may comprise first, second, third and fourth segments 37, 38, 40, 42. The first, second and third segments 37-40 may have a shape and size similar to, or the same as, corresponding segments of the first clamp half 8. Thus, the first and third segments 37, 40 are oriented generally parallel to the longitudinal axis "A-A" of the clamp 6, and are connected via the second segment 38 which is angled with respect to the longitudinal axis. The second set of projections 26 is disposed in the first segment, while the fastener recesses 14 are disposed in the third segment 40. The fourth segment 42 of the second clamp half 10 is connected to the third segment 40 and is oriented generally perpendicular to the longitudinal axis "A-A" of the clamp 6. The first set of projections 24 are disposed at an end of the fourth segment 42 are sized and positioned to be received within the first set of recesses 20 in the first clamp half 8.

FIGS. 2 and 3 show the clamp 6 in the assembled and fully tightened configuration. That is, the fasteners 12 are tightened such that the first and section clamp halves 8, 10 are fixed together and the first and second sets of projections 24, 26 are fully engaged with the first and second sets of recesses 20, 22. These figures show the clamp 6 alone, without the context of a roof seam 4. By contrast, FIG. 4 shows the clamp 6 engaged with a portion of a roof seam 4. As shown in this figure, the fasteners 12 have been tightened such that the second set of projections 26 have deformed a portion of the roof seam 4 into the second set of recesses 22. As can be seen, in this embodiment the projections themselves do not engage the recesses 22. It will be appreciated that the fasteners 12 could be tightened sufficiently to force the projections (along with the roof seam material) into the recesses 22, but it is not necessary to do so to achieve a desired tight connection between the clamp 6 and the roof seam 4.

As can be seen in FIGS. 2 and 3, the second set of projections 26 may have a rounded tip to concentrate the force applied from the fasteners 12 to deform the metal of the roof seam 4 into the second set of recesses 22 when the clamp is tightened. It will be appreciated that such a rounded configuration is not critical, and the projections could have a variety of shapes such as pointed, flat, stepped, and the like. A rounded surface may be desirable, however, to minimize the chance that the seam material will be pierced by the projections.

As previously noted, the clamp 6 includes a feature that provides keyed engagement between the clamp halves. In the illustrated embodiment, this keyed engagement is provided by the interaction between recesses 20 and projections 24. The first set of projections 24 may be of any desired shape, but in the illustrated embodiment they are rectangular and are sized to fit loosely within the first set of recesses 20. These projections 24, in combination with the first set of recesses 20, function as a detent that holds the clamp halves 8, 10 together while the fasteners 12 are loosened to enable the first end 16 of the clamp 6 to be slipped over an associated roof seam 4. This detent arrangement reduces the total amount of work required to fit-up and tighten the clamp 6 compared to previous designs.

As previously noted, the arrangement of multiple recesses 20, 22 and multiple associated projections 24, 26 serve to align the clamp 6 and also to provide the clamp with a desired high degree of rigidity upon installation. Although the illustrated embodiment shows the first and second sets of recesses 20, 22 formed in the first clamp half 8 and the first and second sets of projections 24, 26 formed in the second clamp half 10, it will be appreciated that the configuration could be switched such that the recesses are formed in the second clamp half and the projections formed in the first clamp half. Other similar permutations are also contemplated.

In one embodiment, the clamp 6 can be delivered to a user in the tightened condition shown in FIGS. 2 and 3. Prior to installation, the user can back off the fasteners 12 slightly to open a gap between the second set of projections 26 and the second set of recesses 22 so that the first end 16 of the clamp 6 can be slid down onto a targeted roof seam 4. The previously described detent feature holds the clamp together, enabling the user to engage the clamp with the roof seam using a single hand. Subsequent tightening of the fasteners 12 serves to deform a portion of the roof seam 4 into the second recesses 22, locking the clamp 6 to the roof 1.

FIGS. 7-10 show another embodiment of a clamp 60 for engaging a standing seam type roof. Clamp 60 may include all of the features described in relation to clamp 6 of FIGS. 2-6, with the exception that clamp 60 has three projections and three recesses for clamping to a roof seam 4 upon tightening of the fasteners 66. As will be described, the positioning of these three projections and three recesses causes the roof seam 4 to be deformed into a "wave" pattern when the clamp 60 is tightened onto the seam 4.

Clamp 60 includes first and second opposing clamp halves 62, 64 that are engageable with each other via fasteners 66 in the manner described in relation to clamp 6. A first projection 68a resides on the first clamp half 62, while second and third projections 68b, 68c reside on the second clamp half 64. Correspondingly, the first clamp half 62 includes first and second recesses 70a, 70b that are sized and configured to receive second and third projections 68b, 68c, while the second clamp half 64 includes a third recess 70c that is sized and configured to receive the first projection 68a. As can be seen, the projections 68a-c are staggered so that the first projection 68a is positioned between the second and third projections 68b, 68c when the clamp halves 62, 64 are connected.

Thus, when the clamp halves 62, 64 are connected and tightened onto a seam 4 of a standing seam roof 1, the roof seam is deformed by the projections 68a-c such that a portion of the seam is received within the recesses 70a-c. The resulting "wave" pattern results in a high-strength connection between the clamp 60 and the seam 4. As with the previous embodiment, the projections 68a-c may simply serve to deform the roof seam 4 into the recesses 70a-c such that the projections themselves are not received within the recesses. It will be appreciated that a clamp may also be provided with greater than three projections and recesses, as desired.

Figure 11:
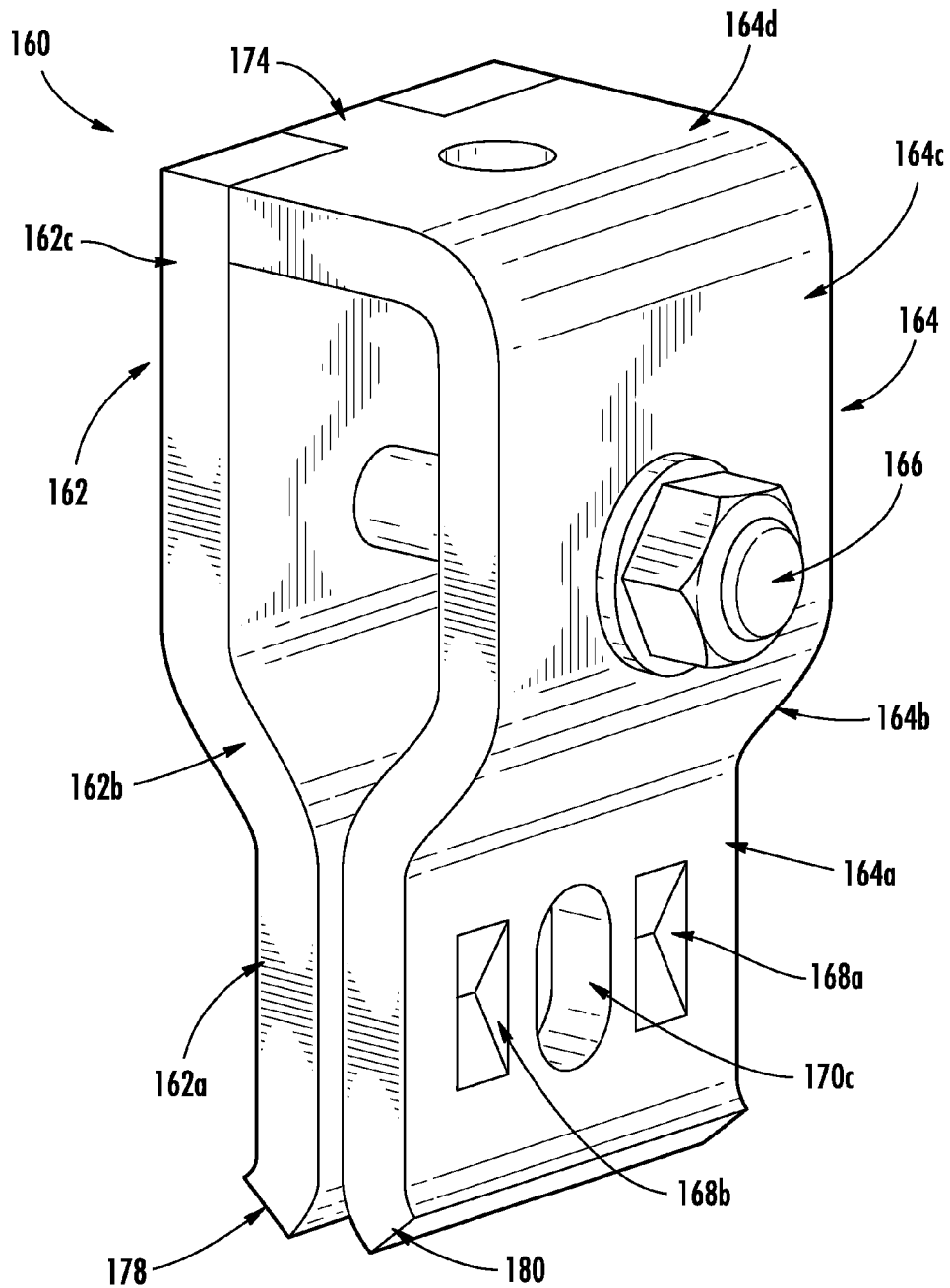
FIG. 11 is an isometric view of a further embodiment of a clamp for engaging a standing seam roof.
Figure 12A:
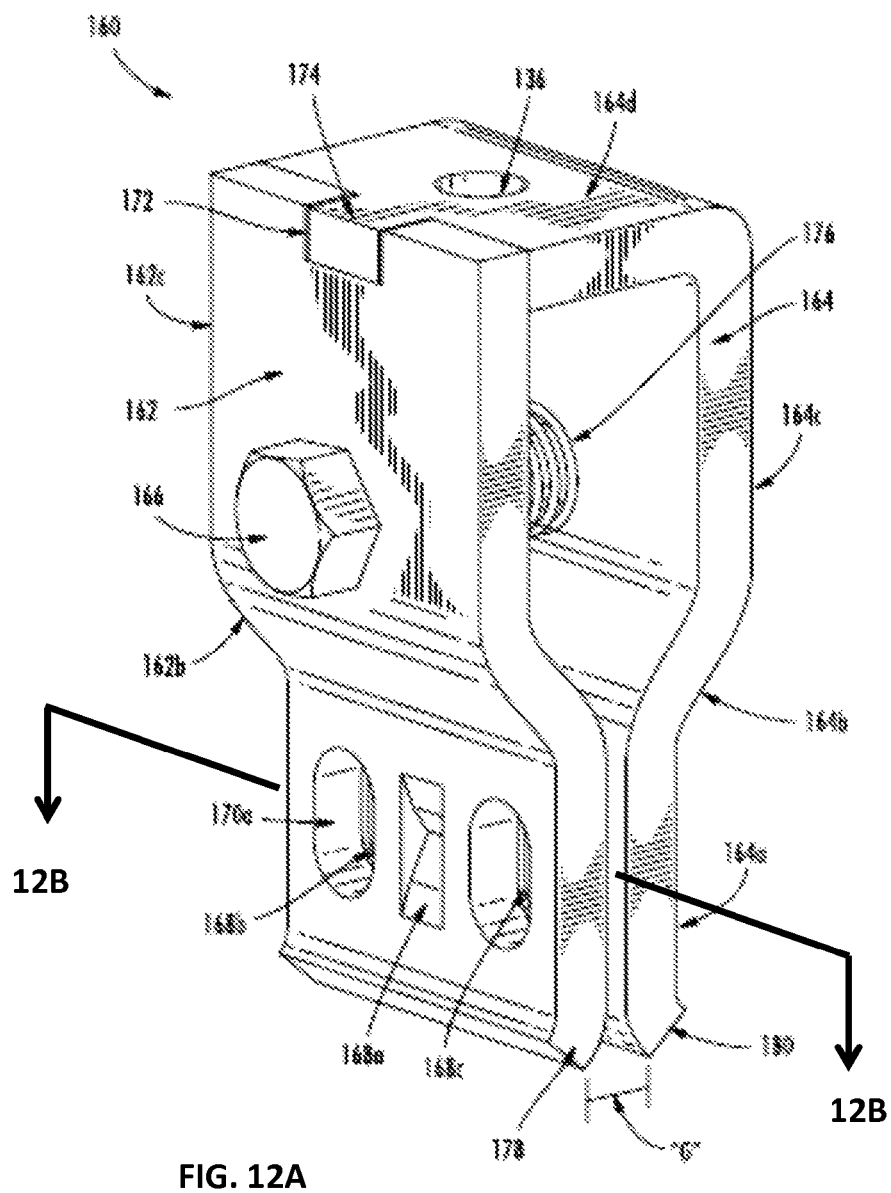
FIG. 12A is a reverse isometric view of the clamp of FIG. 11.
Figure 12B:
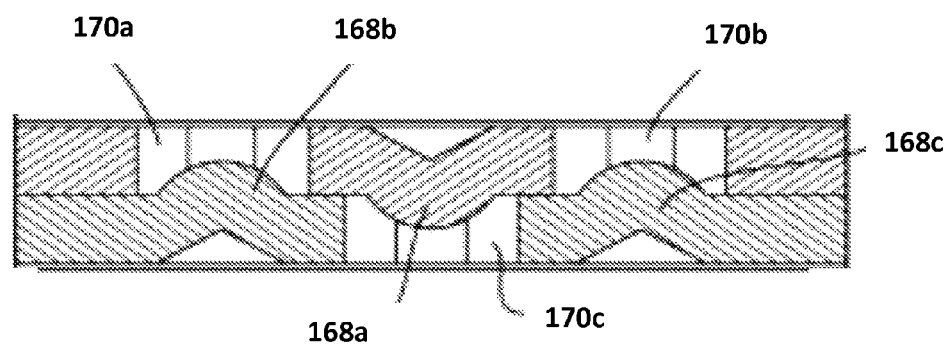
FIG. 12B is a cross-section of an alternative embodiment of the clamp of FIG. 11, taken alone line 12B-12B of FIG. 12A, showing rounded projections.
Figure 13:
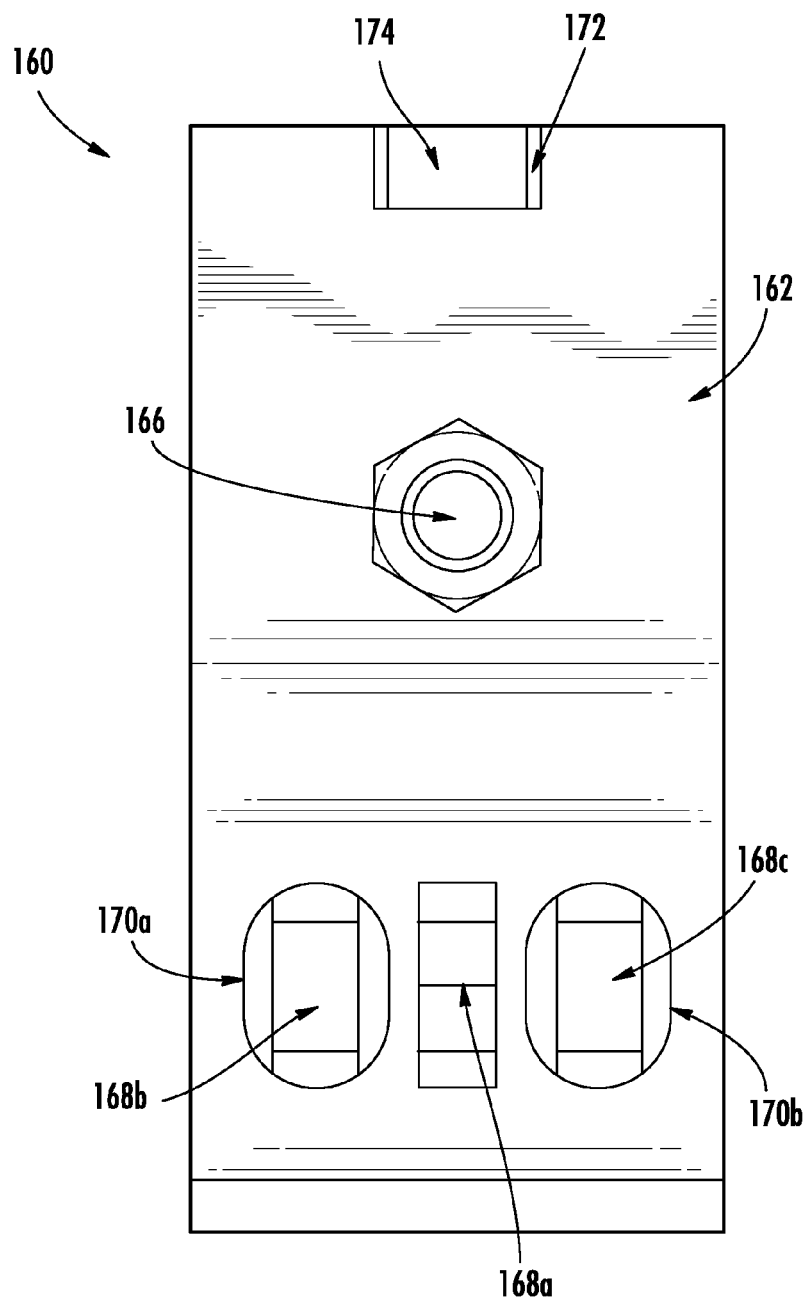
FIG. 13 is a side view of the clamp of FIG. 11.

FIGS. 11-13 show a further embodiment of a clamp 160 for engaging a standing seam type roof. Clamp 160 may include some or all of the features described in relation to clamps 6 and 60 of FIGS. 2-10. Clamp 160 has three projections and three recesses for clamping to a roof seam 4, and as described in detail in relation to clamp 60, the positioning of these projections and recesses may cause the roof seam 4 to be deformed into a "wave" pattern when the clamp 160 is tightened onto the seam 4.

Clamp 160 includes first and second opposing clamp halves 162, 164 that are engageable with each other via a single fastener 166 in a manner similar to that described in relation to clamps 6, 60. A first projection 168a resides on the first clamp half 162, while second and third projections 168b, 168c reside on the second clamp half 164. Correspondingly, the first clamp half 162 includes first and second recesses 170a, 170b that are sized and configured to receive the second and third projections 168b, 168c, while the second clamp half 164 includes a third recess 170c that is sized and configured to receive the first projection 168a. As can be seen, the projections 168a-c are staggered so that the first projection 168a is positioned between the second and third projections 168b, 168c when the clamp halves 162, 164 are connected.

Thus, when the clamp halves 162, 164 are connected and tightened onto a seam 4 of a standing seam roof 1, the roof seam is deformed by the projections 168a-c such that a portion of the seam is received within the recesses 170a-c. The resulting "wave" pattern results in a high-strength connection between the clamp 160 and the seam 4. It will also be appreciated that a clamp may also be provided with greater than three projections and recesses, as desired. In one embodiment, shown in FIG. 12B, the projections 168a-c are rounded.

The clamp 160 of FIGS. 11-13 may include one or more simplified design features as compared to the previously described embodiment. For example, the clamp halves 162, 164 are connected using a single fastener 166, as compared to the multi-fastener designs of the previous embodiments. In the illustrated embodiment, the fastener 166 is a nut/bolt combination. It will be appreciated, however, that any of a variety of adjustable fasteners could also be used. In addition, keyed engagement between the clamp halves 162, 164 is provided by the interaction between a single recess 172 and a single projection 174. As noted, this keyed engagement between clamp halves serves to hold the halves 8, 10 together while the fastener 166 is loosened to enable the clamp 160 to be slipped onto an associated roof seam 4.

The clamp halves 162, 164 may each include a plurality of individual segments 162a-c, 164a-d shaped and configured in a manner substantially similar to that of the previously described embodiments. Unlike the previous embodiments, however, a top surface of segment 162c is positioned to be flush with a top surface of segment 164d (prior embodiments included a cantilevered top segment 34). The resulting arrangement provides a box-like structure that enhances the strength and rigidity of the clamp 160. This strength and rigidity is further enhanced by the interlocking of recess portion 172 (of segment 162c) and projection portion 174 (of segment 164d).

Upper segment 164d includes a hole 136 to enable the clamp 160 to engage a solar panel grid structure (e.g., a channel member) using a single fastener. It will be appreciated that segment 164d could include more than one fastener hole, as desired to suit a particular application. In some embodiments, the hole 136 can be square to enable it to receive a carriage bolt.

As shown in FIG. 12A, the clamp 160 may also include a spring 176 disposed about the shaft of the fastener 166 which connects the clamp halves 162, 164. The spring is sized to engage the inner surfaces of clamp half segments 162c, 164c to bias the clamp halves apart when the fastener 166 is in the loosened condition. As will be appreciated, this "biased open" configuration enables the clamp 160 to hold its shape while it is being fit onto a standing seam 4, prior to tightening of the fastener 166. As will be appreciated, this arrangement facilitates easier installation of the clamp 160. It will be appreciated that although the spring 176 is illustrated as being a coil spring, any of a variety of spring types may be used to provide the desired "biased open" configuration.

As can be seen in FIGS. 11 and 12A, the clamp 160 may further include a flared insertion end that further facilitates insertion of the clamp onto a targeted roof seam 4. Thus, distal ends of clamp segments 162a, 164a may include flared sections 178, 180 that diverge in order to provide a larger insertion gap "G" between the segments than exists between the flat, parallel, portions of segments 162a, 164a. As will be appreciated, this increased insertion gap "G" makes it easier to feed the roof seam 4 into the gap clamp 160 onto a roof seam 4.

The disclosed clamp 6, 60, 160 may be produced in a variety of sizes depending upon the configuration of the roof seams and the solar panels or solar panel grids that will attach to it, as well as the amount of clearance desired between the panels and the roof. In one non-limiting embodiment, the clamp 6, 60, 160 may have a length "L" (see FIG. 4) as measured along its longitudinal axis "A-A" of about 4-inches. The clamp 6, 60, 160 may have a width "W" of about 2½-inches (as measured across the fourth segment 34 of the first clamp half 8), and a depth "DP" (see FIG. 5) of about 3-inches to provide a desired connection pad for connecting to a solar panel grid.

The disclosed clamp 6, 60, 160 may be formed from thin gauge steel (e.g., ¼-inch), bent to assume the appropriate shape and stamped to incorporate the previously described recesses and projections. The clamp may alternatively be made from other metals of appropriate mechanical strengths. Materials such as fiberglass, aluminum and reinforced polymers may also be used depending upon the needs and restrictions of the project.

Where the disclosed clamp 6, 60, 160 is made from steel, it may be fabricated by blanking the raw material to the basic size in a conventional mechanical punch press. The pierced details (i.e., holes) may be added after forming through the use of a conventional mechanical punch press.

The disclosed clamp 6, 60, 160 provides a universal attachment mechanism for anchoring a wide range of solar panel designs through the use of a universal grid system which is attached to a standing seam roof structure. The attachment of the clamp 6, 60, 160 to a building structure is a simple process regardless of the building configuration due to the variety of attachment points provided by the clamp. In one embodiment relating to strut grid applications, grids can be assembled as modules and lifted into place for attachment to the clamp 6, 60, 160. This attribute provides the user with reduced labor costs for the installation of a typical solar grid.

The disclosed clamp can be provided in multiple manners, dependent upon location of the project, relationships with the Solar Panel Manufacturer, Installation Contractor or end user. The clamp can be provided individually as a component to be integrated into a design. Further, the clamp can be provided to Solar Panel Manufacturers as a preferred method of attachment of their Solar Panels. It could also be provided as a part of a system approach including materials to fabricate and assemble an associated grid. Further, the clamp can be provided as a part of a total installation contract involving all or part of the structural aspects of a particular project.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A solar panel clamp, comprising:
   first and second opposing clamp portions;
   the first clamp portion comprising a first end and a second end, the first end including a first projection and the second end including a first recess;
   the second clamp portion comprising a first end and a second end, the first end including a second recess and the second end including a second projection;
   a fastener engageable with the first and second clamp portions;
   the clamp having a loosened configuration in which the first projection is received within the second recess and the second projection is spaced apart from the first recess by a first distance, and the clamp further has a tightened configuration in which the first projection is received within the second recess and the second projection is receivable within the first recess;
   one of the first and second clamp portions further includes a receiving section disposed substantially perpendicular to a longitudinal axis of the solar panel clamp, the receiving section having at least one fastener hole to facilitate connecting said clamp to a solar panel grid.

2. The solar panel clamp of claim 1, comprising a spring disposed between the first and second clamp portions to bias the clamp portions apart.

3. The solar panel clamp of claim 2, the spring comprising a coil spring disposed about the fastener.

4. The solar panel clamp of claim 1, the second ends of the first and second clamp portions having distal portions that are flared apart.

5. The solar panel clamp of claim 1, wherein the second projection is rounded.

6. A clamp, comprising:
   first and second opposing clamp portions engageable with each other at first and second ends; and
   a fastener engaged with the first and second clamp portions;
   the clamp having a loosened configuration in which the first and second clamp portions are connected at the first end and are separated by a first distance at the second end;
   the clamp having a tightened configuration in which, at the second end, the first and second clamp portions are positioned closer to each other than the first distance;
   the first and second clamp portions having corresponding projections and recesses disposed at the second end for deforming a captured portion of a roof seam into the recess disposed at the second end as the clamp is moved from the loosened configuration to the tightened configuration;
   one of the first and second clamp portions having a receiving section disposed substantially perpendicular to a longitudinal axis of the clamp, the receiving section having at least one fastener hole to facilitate connecting said clamp to a solar panel grid.

7. The clamp of claim 6, comprising a spring disposed between the first and second clamp portions to bias the clamp portions apart.

8. The clamp of claim 6, the second ends of the first and second clamp portions having distal portions that are flared apart.

9. The clamp of claim 6, wherein the projections are rounded.

10. The clamp of claim 6, the receiving section associated with the first end of said first clamp portion.

11. A solar panel clamp, comprising:
    first and second opposing clamp portions;
    the first clamp portion comprising a first end and a second end, the first end including a first projection and the second end including a first recess;
    the second clamp portion comprising a first end and a second end, the first end including a second recess and the second end including a second projection;
    a coil spring disposed between the first and second clamp portions to bias the clamp portions apart; and a fastener engageable with the first and second clamp portions, the coil spring disposed about the fastener;

wherein the clamp has a loosened configuration in which the first projection is received within the second recess and the second projection is spaced apart from the first recess by a first distance, and the clamp further has a tightened configuration in which the first projection is received within the second recess and the second projection is positioned closer to the first recess than said first distance.

12. The solar panel clamp of claim 11, the second ends of the first and second clamp portions having distal portions that are flared apart.

13. The solar panel clamp of claim 11, wherein the second projection being rounded.

14. The solar panel clamp of claim 11, one of the first and second clamp portions having a receiving section disposed substantially perpendicular to a longitudinal axis of the solar panel clamp, the receiving section having at least one fastener hole to facilitate connecting said clamp to a solar panel grid.

* * * * *